(12) United States Patent
Garland et al.

(10) Patent No.: US 9,536,567 B2
(45) Date of Patent: *Jan. 3, 2017

(54) TRANSCRIPT RE-SYNC

(75) Inventors: Jacob B. Garland, Marietta, GA (US);
Drew Lanham, Menlo Park, CA (US);
Daryl Kip Watters, Marietta, GA (US);
Marsal Gavalda, Sandy Springs, GA (US); Mark Finlay, Tucker, GA (US);
Kenneth K. Griggs, Roswell, GA (US)

(73) Assignee: NEXIDIA INC., Atlanta, GA (US)

( * ) Notice: Subject to any disclaimer, the term of this patent is extended or adjusted under 35 U.S.C. 154(b) by 614 days.

This patent is subject to a terminal disclaimer.

(21) Appl. No.: 13/602,991

(22) Filed: Sep. 4, 2012

(65) Prior Publication Data
US 2013/0060572 A1 Mar. 7, 2013

Related U.S. Application Data (60) Provisional application No. 61/530,458, filed on Sep. 2, 2011.

(51) Int. Cl.
| | |
|---|---|
| G10L 15/04 | (2013.01) |
| G10L 15/26 | (2006.01) |
| G10L 21/00 | (2013.01) |
| G10L 15/00 | (2013.01) |
| G11B 27/10 | (2006.01) |

(52) U.S. Cl.
CPC ............... *G11B 27/10* (2013.01); *G10L 15/04* (2013.01)

(58) Field of Classification Search
CPC .......... G10L 15/04; G10L 15/26; G10L 21/00; G10L 15/00
USPC ................ 704/251, 254, 235, 243, 258, 278
See application file for complete search history.

(56) References Cited

U.S. PATENT DOCUMENTS 7,231,351 B1 * 6/2007 Griggs ..................... G10L 15/26
704/243
7,263,484 B1 * 8/2007 Cardillo ............ G06F 17/30681
704/231
7,292,979 B2 * 11/2007 Karas ................ G06F 17/30017
704/243

(Continued)

OTHER PUBLICATIONS

Clement et al., Voice/Audio Information Retrieval: Minimizing the Need for Human Ears, 2007.*

(Continued)

*Primary Examiner* — Pierre-Louis Desir
*Assistant Examiner* — Seong Ah A Shin
(74) *Attorney, Agent, or Firm* — Pearl Cohen Zedek Latzer Baratz LLP (57) ABSTRACT

In an aspect, in general, method for aligning an audio recording and a transcript includes receiving a transcript including a plurality of terms, each term of the plurality of terms associated with a time location within a different version of the audio recording, forming a plurality of search terms from the terms of the transcript, determining possible time locations of the search terms in the audio recording, determining a correspondence between time locations within the different version of the audio recording associated with the search terms and the possible time locations of the search terms in the audio recording, and aligning the audio recording and the transcript including updating the time location associated with terms of the transcript based on the determined correspondence.

21 Claims, 2 Drawing Sheets

(56) References Cited

U.S. PATENT DOCUMENTS

| | | | | |
|---|---|---|---|---|
| 7,487,086 B2* | 2/2009 | Griggs | ................... | G10L 15/26 704/235 |
| 7,640,161 B2* | 12/2009 | Morris | ................... | G10L 15/26 704/258 |
| 8,560,327 B2* | 10/2013 | Neubacher | ............ | G06F 17/241 704/231 |
| 2006/0149558 A1* | 7/2006 | Kahn | ................... | G10L 15/063 704/278 |
| 2012/0278071 A1* | 11/2012 | Garland | ................ | H04M 11/10 704/235 |
| 2013/0035936 A1* | 2/2013 | Garland | ................ | G10L 15/26 704/235 |
| 2013/0322634 A1* | 12/2013 | Bennett | ................... | G10L 21/00 381/17 |

OTHER PUBLICATIONS

Clement et al.,"Voice/Audio Information Retrieval: Minimizing the Need for Human Ears", 2007, IEEE, pp. 613-pp. 623.*

* cited by examiner

FIG. 1

FIG. 2

TRANSCRIPT RE-SYNC

CROSS-REFERENCE TO RELATED APPLICATIONS

This application claims the benefit of U.S. Provisional Application No. 61/530,458 filed Sep. 2, 2011, titled TRANSCRIPT RE-SYNC.

BACKGROUND

This invention relates to re-synchronization of transcripts and media.

Many types of media include an audio recording which includes speech. For example, video media generally includes both a video recording and an audio recording which includes speech. In some examples, a transcript of the speech included in an audio recording is also included with the media. Such a transcript can be searched for keywords in order to determine a temporal location of an utterance in the audio recording of the media. The transcripts may also be used to overlay a closed captioned version of an audio recording onto a video recording of a video recording (e.g., a recording of a news program).

It is common for users of media editing software to modify media, including an audio recording (e.g., by removing sections of the audio recording) without taking care to also modify the transcription of the media.

SUMMARY

In an aspect, in general, a method for aligning an audio recording and a transcript includes receiving a transcript including a plurality of terms, each term of the plurality of terms associated with a time location within a different version of the audio recording, forming a plurality of search terms from the terms of the transcript, determining possible time locations of the search terms in the audio recording, determining a correspondence between time locations within the different version of the audio recording associated with the search terms and the possible time locations of the search terms in the audio recording, and aligning the audio recording and the transcript including updating the time location associated with terms of the transcript based on the determined correspondence.

Aspects may include one or more of the following features.

Updating the time location associated with the terms of the transcript may include determining a first time difference between a first time location within the different version of the audio recording associated with a first term of the transcript and a second time location within the different version of the audio recording associated with a second term of the transcript, updating the first time location based on the determined correspondence, resulting in an updated first time location, updating the second time location based on the determined correspondence, resulting in an updated second time location, determining a second time difference between the updated first time location and the updated second time location, determining if the first time difference and the second time difference are similar, and if so, predicting the time locations associated with a plurality of terms located between the first term and the second term, and updating the time locations associated with the plurality of terms located between the first term and the second term based on the predicted time locations of the terms.

Updating the time locations associated with the plurality of terms located between the first term and the second term may include verifying the predicted time locations of the terms including searching for each of the terms located between the first term and the second term at the predicted time location in the audio associated with the term. The method may include determining if the first time difference and the second time difference are similar includes determining a measure of time dilation between the audio recording and the different version of the audio recording and compensating for the time dilation when determining the similarity between the first time difference and the second time difference.

Aligning the audio recording and the transcript may include manually associating at least some of the time locations associated with the terms of the transcript with time locations in the audio recording. The different version of the audio recording may include a time axis which differs from a time axis of the audio recording. Each term of the plurality of terms may include one or more words.

Each of the search terms of the plurality of search terms may include a plurality of phonemes determined from the terms of the transcript. Determining the possible time locations of the search terms in the audio recording may include performing a phonetic search for the search terms. Performing the phonetic search may include searching using a wordspotting algorithm.

In another aspect, in general, a system for aligning an audio recording and a transcript includes an input for receiving the audio recording, an input for receiving a transcript including a plurality of terms, each term of the plurality of terms associated with a time location within a different version of the audio recording, a search term formation module configured to form a plurality of search terms from the terms of the transcript, an alignment module configured to determine possible time locations of the search terms in the audio recording, determine a correspondence between time locations within the different version of the audio recording associated with the search terms and the possible time locations of the search terms in the audio recording, and align the audio recording and the transcript including, updating the time location associated with terms of the transcript based on the determined correspondence.

Aspects may include one or more of the following features.

The alignment module may be further configured to determine a first time difference between a first time location within the different version of the audio recording associated with a first term of the transcript and a second time location within the different version of the audio recording associated with a second term of the transcript, update the first time location based on the determined correspondence, resulting in an updated first time location, update the second time location based on the determined correspondence, resulting in an updated second time location, determine a second time difference between the updated first time location and the updated second time location, determine if the first time difference and the second time difference are similar, and if so, predicting the time locations associated with a plurality of terms located between the first term and the second term, and update the time locations associated with the plurality of terms located between the first term and the second term based on the predicted time locations of the terms.

The alignment module may be further configured to verify the predicted time locations of the terms including searching for each of the terms located between the first term and the second term at the predicted time location in the audio associated with the term. The alignment module may be further configured to determine a measure of time dilation between the audio recording and the different version of the audio recording and compensate for the time dilation when determining the similarity between the first time difference and the second time difference. The alignment module may be further configured to align the transcript and the audio recording according to a manual association of at least some of the time locations associated with the terms of the transcript with time locations in the audio recording.

The different version of the audio recording may include a time axis which differs from a time axis of the audio recording. Each term of the plurality of terms may include one or more words. Each of the search terms of the plurality of search terms may include a plurality of phonemes determined from the terms of the transcript. The alignment module may be configured to execute a phonetic search on the search terms. Executing the phonetic search may include searching using a wordspotting algorithm.

In another aspect, in general, software stored on a computer-readable medium comprises instructions for causing a data processing system to receive a transcript including a plurality of terms, each term of the plurality of terms associated with a time location within a different version of the audio recording, form a plurality of search terms from the terms of the transcript, determine possible time locations of the search terms in the audio recording, determine a correspondence between time locations within the different version of the audio recording associated with the search terms and the possible time locations of the search terms in the audio recording, and align the audio recording and the transcript including, updating the time location associated with terms of the transcript based on the determined correspondence.

Other features and advantages of the invention are apparent from the following description, and from the claims.

DESCRIPTION

1 Overview

In general, the following application describes re-synchronization of transcripts of media with corresponding audio recordings included with the media. The application discusses re-synchronization in the context of video media. However, it is noted the system and methods described above can apply to any type of media which includes an audio recording including speech and a corresponding transcription of the audio recording.

A typical video file includes a video recording and one or more corresponding audio recordings. As is described above, video files are also commonly associated with a transcript of speech included in the audio recording(s). In general, the transcript includes a number of lines of text (i.e., captions), each representing speech in the audio recording and associated with a timecode (i.e., a timecode) in the audio recording.

When a user of video editing software adds or removes portions of the video and corresponding audio recording(s), they often neglect to remove the corresponding section of the transcript. Thus, the transcript differs from and is no longer synchronized (or aligned) with the contents of the video file. That is, at least some of the timecodes in the transcript are no longer correctly synchronized with the audio recording.

2 Transcript Re-Synchronization System

Figure 1:
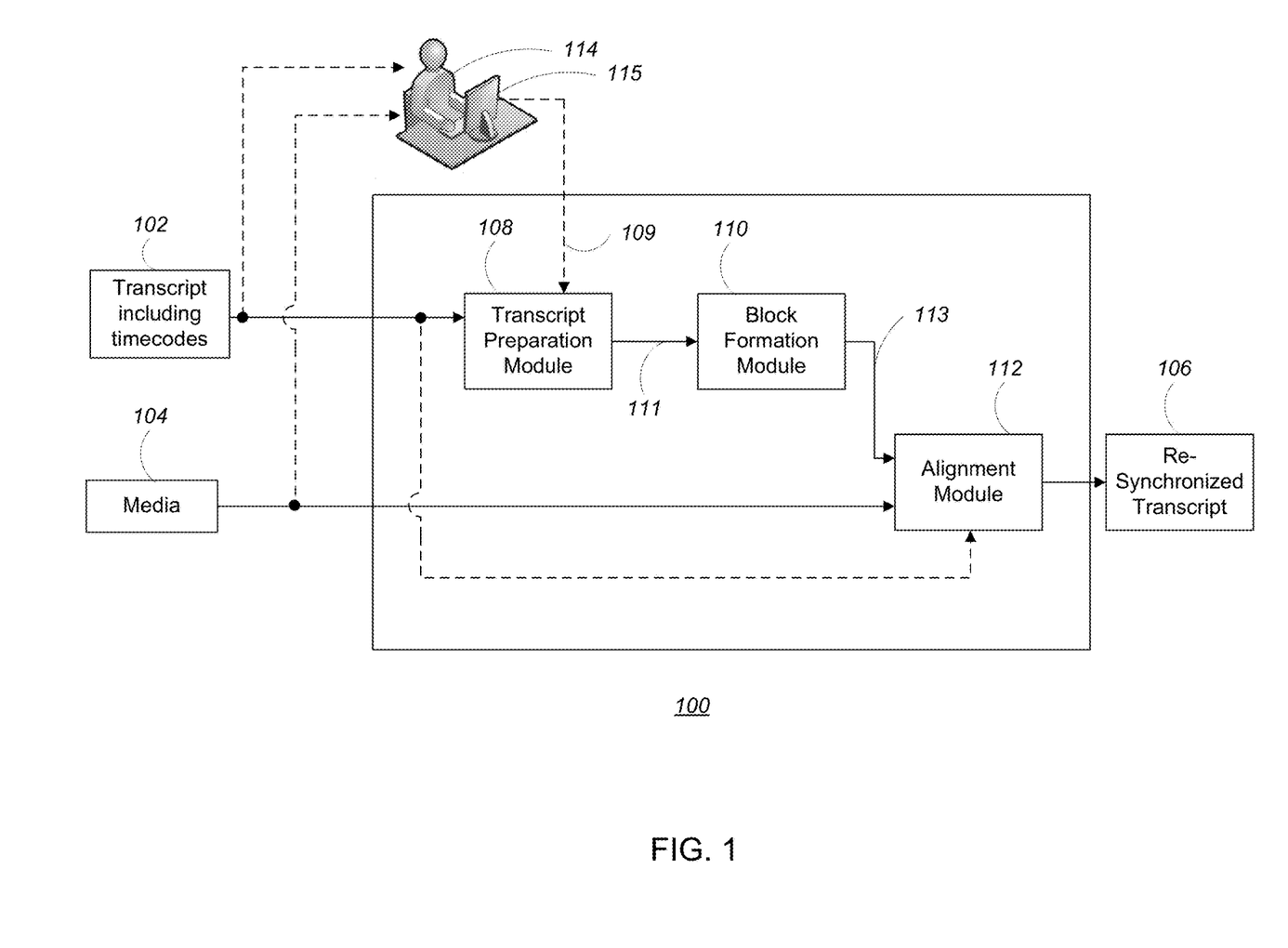
FIG. 1 is a transcript re-synchronization system.

Referring to FIG. 1, a transcript re-synchronization system 100 receives a transcript 102 and a corresponding media 104 as input. In general, the captions of the transcript 102 were, at one point, partially or fully aligned to the media 104 by one or more timecodes. However, due to modification of the media 104, at least some of the timecodes (referred to as "hints" on input to the system 100) of the transcript 102 are out of synchronization with the media 104. The system 100 processes the transcript 102 and the media 104 to generate a re-synchronized transcript 106 such that the captions of the re-synchronized transcript 106 are correctly aligned with a time index into an audio recording associated with the media 104. The system 100 includes a transcript preparation module 108, a block formation module 110, and an alignment module 112.

2.1 Transcript Preparation

The transcript preparation module 108 receives the transcript 102 and prepares it for further processing by removing all non-speech entries (e.g., "ha ha," "argh," "ahh," etc.) from the transcript 102 using, for example, a text normalization engine (not shown). The transcript preparation module 108 also removes any non-spoken text (e.g., "[music playing]" or "Closed Captioning Provided By . . . ") from the transcript 102.

2.1.1 Optional Manual Alignment

Optionally, the transcript preparation module 108 can receive manual alignment information 109 from a user 114 who has analyzed the transcript 102 and media 104 to manually align certain sections of the transcript 102 to the correct timecode in the media 104. In some examples, the user 114 utilizes a user interface of a computer to identify a set of captions around the largest non-speech time intervals in the transcript 102 occur and choose the identified captions for manual alignment. For example, two captions which are separated by a time interval which is greater than some predetermined time interval (e.g., 15 seconds) can be chosen. The user 114 then manually aligns the selected captions to the proper timecode in the media 104. The first caption in the transcript 102 is also aligned to its proper timecode in the media.

Manual alignment information 109 defined by the user 114 is passed to the transcript preparation module 108 where, starting from the beginning of the transcript 102, a forward ripple edit is performed based on the manually aligned sections of the transcript 102. In particular, for each manually aligned caption, all of the captions following the manually aligned caption are time-shifted such that the manually aligned caption has the correct timecode, and all captions succeeding the manually aligned caption have the same relative position to the manually aligned caption.

It is noted that the above transformation may cause later captions to occur earlier than previous captions. In such a case, the later captions can be interpolated such that they occur before the aligned caption. This situation would occur, for example, if there had been an edit between the 2 manually aligned captions, causing the manually aligned times to be less than the spacing defined in the original (hint) captions. The interpolation proceeds as follows:

a. Compute the delta time in the original hint captions between the 2 captions that have been manually aligned (delta hint time).
b. Compute the delta time between the 2 captions using the manual time alignments (delta manual time).
c. Compute RescaleFactor=(delta manual time)/(delta hint time).
d. Modify the forward ripple edit to multiply each relative time offset by RescaleFactor, for the edits between the 2 manually aligned captions. This will guarantee that the estimated caption times are now in strict ascending time order, and that the beginning and end captions match the manually aligned caption times. Note that interpolation is only useful as an approximation as input for subsequent re-sync steps.

The transcript preparation module 108 marks the manually aligned captions as having a known, good alignment. In some examples, the manually aligned captions are assigned a maximal synchronization score (e.g., 1.0). In some examples, such manually aligned captions are always preserved by the system (i.e., they are not modified by downstream modules in the system 100).

The output of the transcript preparation module 108 is a prepared transcript 111.

2.2 Block Formation

The prepared transcript 111 is passed to a block formation module 110 which groups the words in the prepared transcript 111 into blocks. In some examples, the captions included in the prepared transcript 111 are merged or split as necessary to ensure that the blocks include an optimal number of phonemes (e.g., 20-25 phonemes). Where possible, the original captions included in the prepared transcript 111 are preserved. The output of the block formation module 110 is a blocked transcript 113.

As is mentioned above, in some examples, those blocks in the blocked transcript 113 that represent at least the beginning of a time-coded caption are associated with a "caption hint," where the term "caption hint" refers to a time code which represents a timecode of the original caption into the audio recording, the timecode included in the original transcript 102 or optionally time-shifted as described above.

The blocked transcript 113 is passed to the alignment module 112, along with the media 104. The alignment module 112 processes the blocked transcript 113 and the media 104 (as is described below) to form the aligned transcript 106.

2.3 Alignment

Figure 2:
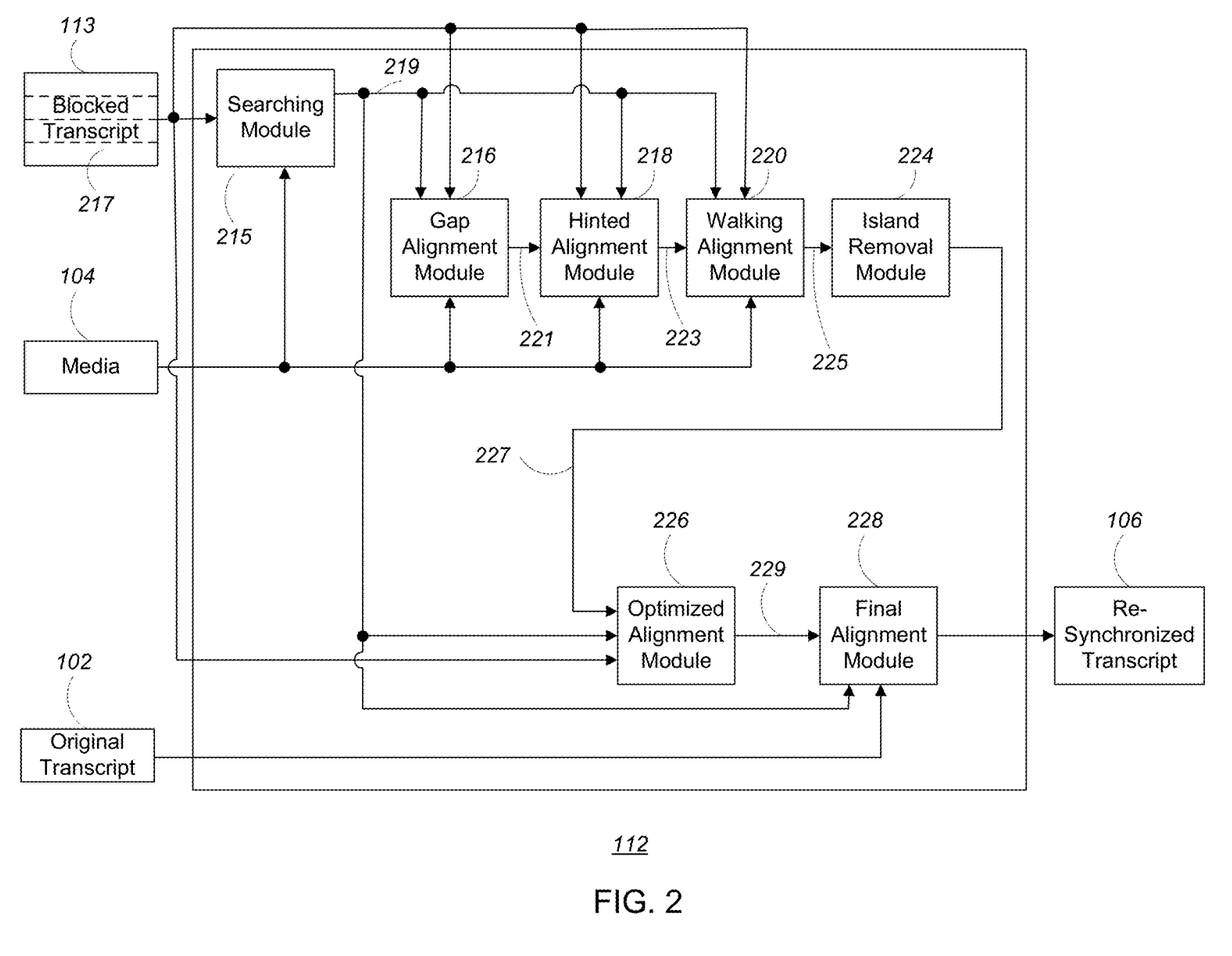
FIG. 2 is an alignment module of a transcript re-synchronization system.

Referring to FIG. 2, the alignment module 112 includes a searching module 215, a gap alignment module 216, a hinted alignment module 218, a walking alignment module 220, an island removal module 224, an optimized alignment module 226, and a final alignment module 228.

In some examples, one or more of the modules included in the alignment module are executed repeatedly to iteratively converge to an alignment result. In some examples single modules are executed repeatedly. In other examples, a group of modules are executed sequentially and sequential execution of the group of modules is executed repeatedly.

2.3.1 Searching Module

Several of the modules in the alignment module 112 are configured to select blocks from the blocked transcript 113 and use the searching module 215 to identify putative locations in the media 104 of speech representing the text in the selected block. In some examples, the searching module 215 includes a wordspotting based search engine as described in U.S. Pat. No. 7,263,484, which is incorporated by reference. Such a wordspotting based search engine has the capability to:
a. Accept a search term as input and provide a collection of results back with a confidence score and timecode for each result, and
b. Allow the caller to specify a number of search results to be returned, which may be unrelated to the number of actual occurrences of the search term in the audio.

It is noted that any other type of search algorithm which satisfies the above capabilities can be used to locate search terms in the media 104. For example, an output of a speech recognition engine (e.g., a large vocabulary conversational speech recognition engine) could be processed to locate the search terms in the media 104.

The searching module 215 returns search results 219 for each of the blocks 217 of the blocked transcript 113. Each of the search results 219 includes a confidence score and a timecode. The confidence score indicates the confidence with which the search engine believes that the search term occurs at that timecode in the media.

As is described in U.S. Pat. No. 7,263,484, each block 217 of the blocked transcript 113 can be processed into multiple queries or queries including modified versions of the block 217 which are each searched for independently.

2.3.2 Gap Alignment Module

The search results 219, the blocked transcript 113, and the media 104 are passed to the gap alignment module 216 which uses the search results with the highest confidence score to determine highly likely timecodes for at least some of the blocks. The determined highly likely timecodes are accepted as being correct alignments.

The gap alignment module 216 iterates through at least some of the blocks 217 in the blocked transcript 113 looking for a search result for a block that is most probably correct. That search result is then tentatively accepted as correct and a timecode for that block is set as the timecode of the chosen search result. The blocked transcript 113 is then divided into two segments, and the process is repeated on each segment separately. This approach handles incomplete or moderately inaccurate transcriptions.

It is noted that the search result that is "most probably correct" is a heuristic determination. One example of a heuristic is:
a. The search result must be the highest-ranked result for that search term for that block.
b. The search result must have a confidence score above a certain score threshold.
c. The gap between the score of the highest-ranked result and the score of the next-highest ranked result must be greater than a certain gap threshold.
d. If there is more than one block that has a search result that meets the above criteria, the block with the greatest gap is accepted as "most probably correct."

As is noted above, the process described above can be recursively repeated, aligning at least some (if not the majority) of the blocks 217 of the blocked transcript 113, resulting in a gap aligned transcript 221. A detailed description of gap alignment can be found in U.S. Pat. No. 7,263,484.

2.3.3 Hinted Alignment Module

The blocked transcript 113, the gap aligned transcript 221, the search results 219, and the media 104 are passed to the hinted alignment module 218. The hinted alignment module leverages the caption hints included with at least some of the blocks 217 of the blocked transcript 113 to quickly determine if blocks of the transcript which are in between two blocks with accepted alignments, are also correctly aligned. In particular, for each pair of blocks with accepted alignments,
   a. A first duration is calculated by determining a difference between the accepted timecode of the first block of the pair of blocks and the accepted timecode of the second block of the pair of blocks. The first duration is essentially the determined time duration between the two aligned blocks.
   b. A second duration is calculated by determining a difference between the caption hint of the first block of the pair of blocks and the caption hint of the second block of the pair of blocks. This is essentially the time duration between the two blocks as indicated by the blocked transcript 113.
   c. If the first duration and the second duration are approximately the same, the unaligned blocks between the pair of aligned blocks are iterated over and the caption hints are used to predict the expected timecodes of the blocks between the pair of blocks.
   d. For the predicted timecode of each of the unaligned blocks between the pair of aligned blocks, an audio search (e.g., a wordspotting search) is executed in a small window around the predicted timecode of the unaligned block.
      i. If the confidence score of the audio search around the predicted timecode of the unaligned block is at or above a predefined threshold, the predicted timecode is accepted as a correct timecode for the unaligned block.

In some examples, the media 104 can be sped up or slowed down by adding or removing information from the media. For example, an audio/video recording may be time compressed by periodically removing video frames and periodically dropping audio samples. Such a time compression of the media 104 can adversely affect the performance of the hinted alignment module 218 by, for example, causing a constant time dilation between the assigned alignments and the caption hints.

Thus, in some examples, as an optional step, the hinted alignment module 218 computes a "drift rate" which is used to compensate for "time dilation." In some examples, the drift rate is calculated by:
   a. For each pair of blocks with accepted alignments AND caption hints:
      i. A first duration is calculated by determining a difference between the accepted timecode of the first block of the pair of blocks and the accepted timecode of the second block of the pair of blocks. The first duration is essentially the determined time duration between the two aligned blocks.
      ii. A ratio between the first duration and the second duration is computed. This is the measured "drift rate" between the pair of blocks.
      iii. If there are enough pairs of blocks with accepted alignments AND caption hints:
         1. A median "drift rate" measurement is computed and "drift rate" measurements which are too far from the median are ignored.
         2. An average of the remaining "drift rate" measurements is the measured "drift rate."
         3. If the measured "drift rate" is close to 1.0, then there is no clear evidence of a "drift rate" and the "drift rate" is set to 1.0.

In cases where the measured "drift rate" is a number other than 1.0, the hinted alignment module 218 utilizes the measured "drift rate" when calculating the second duration (i.e., the second duration is multiplied by the measured "drift rate"). The output of the hinted alignment module 218 is a hinted aligned transcript 223.

2.3.4 Walking Alignment Module

The hinted aligned transcript 223, the blocked transcript 113, the search results 219, and the media 104 are passed to the walking alignment module 220 which, for each correctly aligned block in the hinted aligned transcript 223, walks through its neighboring blocks both forward and backward in time. The walking alignment module 220 executes an audio search for each of the neighboring blocks in the portion of the audio recording of the media 104 neighboring the correctly aligned block (i.e., within a reasonable time window of the correctly aligned block). If any of the executed audio searches produces a search result with a high confidence score, then the neighboring blocks are accepted as being correct alignments. The output of the walking alignment module 220 is a walking aligned transcript 225. A detailed description of walking alignment can be found in U.S. Pat. No. 7,263,484.

2.3.5 Island Removal Module

The walking aligned transcript 225 is passed to the island removal module 224 which un-accepts any very small groups of sequential blocks in the walking aligned transcript 225 which have been accepted as correctly aligned. The output of the island removal module 224 is an island removed transcript 227. A detailed description of island removal can be found in U.S. Pat. No. 7,263,484.

2.3.6 Optimized Alignment Module

The island removed transcript 227 is passed to the optimized alignment module 226 which, attempts to align any groups of blocks in the island removed transcript 227 which are not yet accepted as correctly aligned. In particular, the optimized alignment module 226 determines the best available sequence of search results 219 for the groups of blocks and accepts them as correct alignments.

In some examples, optimized alignment module 226 employs a brute force approach which tries all possible combinations of search results 219 for each block above a minimum confidence score to determine a sequence of results with the highest total score.

In some examples, the result of the process above is further processed by splitting long blocks which are not accepted as correct alignments into multiple smaller blocks, each including fewer words than the original block. In some examples, the long blocks are split into smaller segments according to the caption boundaries in the original transcript (if available). In other examples, the long blocks are split into smaller segments such that the number of phonemes included in the resulting blocks are approximately balanced.

The brute force alignment process described above can be recursively executed. The result of the above process is compiled into a preliminary re-synchronized transcript 229. The optimized alignment module 226 implements a recursive process which is described in detail in U.S. Pat. No. 7,263,484.

The preliminary re-synchronized transcript 229 includes a number of captions which are preliminarily re-synchronized to the media 104. Each caption is associated with a timecode which indicates its offset into the media 104. Each caption and its associated timecode can be referred to as a "re-sync result." Some captions in the preliminary re-synchronized transcript 229 are already accepted as being successfully re-synchronized with the media 104. Other captions in the preliminary re-synchronized transcript 229 are not yet accepted as being successfully re-synchronized with the media 104. In some examples, each re-sync result is also associated with a confidence score, indicating how confident the system is that the re-sync result is correctly re-synchronized with the media 104.

3 Final Alignment Module

The preliminary re-synchronized transcript 229 is passed to a final alignment module 228 which applies a final alignment stage to synchronize the captions in the preliminary re-synchronized transcript 229 which are not yet accepted as being successfully re-synchronized with the media 104. It is noted that the final alignment module 228 can accept any type of re-synchronized transcript which includes re-synchronized captions that are associated with confidence scores (i.e., scores that indicate the likelihood that the re-synchronized caption is correctly aligned). Thus, the synchronization procedure described above in section 2 is just one of many ways to generate a preliminary re-synchronized transcript for use by the final alignment module 228.

3.1 Final Alignment Overview

The final alignment module 228 re-processes each caption of the preliminary re-synchronized transcript 229 (i.e., each re-sync result) according to a final alignment algorithm (described below).

In general, for each caption in the initial re-sync result with a non-zero confidence score, the final alignment module 228 performs a search (e.g., a windowed phonetic search) in the region around the putative time offset for the caption. If the preliminary re-synchronized transcript 229 includes no timecode (or 0 confidence) for the caption, then the search is performed starting from the last non-zero confidence scored caption to the following non-zero confidence scored caption.

If the confidence score returned by the search is high enough (i.e., the confidence score exceeds a configurable "Ad hoc search acceptance threshold"), then the caption is considered "accepted" and no further processing is required.

Captions which occur between accepted captions are aligned as follows:
 a. A forward ripple edit is performed (using the offsets provided in the hint captions) starting from the beginning accepted caption. As is described above, the forward ripple edit is performed by, starting from a known good caption, adjusting all succeeding caption times to have the same relative time ordering and spacing as specified in the caption hints.
 b. A backward ripple edit is performed using the ending accepted caption. A backward ripple edit is performed by, starting from a known good caption, all previous captions times are adjust to have the same relative time ordering and spacing as specified in the caption edits.
 c. If the results of the two ripple edits disagree, that is, the 2 ripple edits would cause captions to no longer be in ascending time order (generally meaning an edit occurred in the edited media), then a refined version of the algorithm is used:
  i. The largest "gap" between succeeding hint times is found. That is, between the beginning and ending accepted captions, the largest time difference between 2 successive (un-accepted) captions is found.
   1. The forward ripple edit is terminated at the caption where this gap begins.
   2. The backward ripple edit is terminated at the caption where the gap ends.
 d. Finally, If the backwards ripple edit times are still earlier in time than what the forward ripple edit times are, then use the forward ripple edit times (moving forward through the unaligned captions) until either the ending accepted caption is reached, or the backward ripple edit times are greater than the forward ripple edit times.

3.2 Detailed Algorithm

A more detailed description of the final alignment algorithm is described below.

The preliminary re-synchronized transcript 229 is first processed by a source delta computation module. For each caption in the preliminary re-aligned transcript 229, the source delta computation module computes a difference between the timecode associated with the caption in the preliminary re-synchronized transcript 229 and the timecode which was associated with the same caption in the original transcript 102. This difference is referred to as the "source delta." If the caption cannot be found in the media 104, it is assumed that it has the same relative offset (as indicated by the source delta) to the previous caption's alignment. The source delta is used to adjust succeeding captions that are not accepted (until the next accepted caption is reached).

For example, succeeding captions which are not accepted can be assigned a timecode as follows:

timecode=original timecode+source delta.

That is, the non-accepted caption is allowed to maintain the same relative position it had in the original transcript 102, but shifted according to how the last accepted caption was adjusted.

Each re-sync result of the preliminary re-synchronized transcript 229 is then processed by the final alignment algorithm. First the algorithm tests whether the re-sync result was determined manually. If the test result indicates that the re-sync result was determined manually, then the re-sync result is automatically accepted.

A search algorithm is executed for all other re-sync results. In some examples, a windowed phonetic search is used. In some examples, as is described above, the search algorithm is a wordspotting search algorithm. However, as is noted above, any other type of search algorithm which has the capability to:
 a. Accept a search term as input and provide a collection of results back with a confidence score and timecode for each result, and
 b. Allow the caller to specify a number of search results to be returned, which may be unrelated to the number of actual occurrences of the search term in the audio can be used. For example, an output of a speech recognition engine (e.g., a large vocabulary conversational speech recognition engine) could be used to locate the re-sync results.

In some examples, the a search (e.g., a windowed phonetic search) is executed for the re-sync result on an interval between the previous caption timecode—a time interval (e.g., 1 second), up to the maximum of either the timecode of the re-sync result (if the sync score is above a re-sync acceptance threshold) or the original timecode of the caption+the source delta+a time interval (e.g., 1 second). The phonetic search returns a search result, including a confidence score indicating a likelihood that a re-sync result actually exists within the above time interval in the media 104.

In some examples, if the caption associated with the re-sync result has three or fewer phonemes, that caption is combined with the next caption in the preliminary re-synchronized transcript 229 before performing the search.

The search determines top search results (e.g., the top five search results according to confidence score) and the search result with the earliest timecode is chosen as the search result (to prevent matching to the wrong caption when the same caption is spoken multiple times).

Following the search, re-sync result's pre-existing timecode is accepted if:
  its re-sync confidence score exceeds the re-sync acceptance threshold AND its timecode minus the search result's timecode less than an Ad hoc acceptance time window AND its re-sync confidence score exceeds an Ad hoc search acceptance threshold.

Furthermore, a re-sync result which includes a confidence score that is less than the re-sync acceptance threshold accepts the pre-existing re-sync timecode if:
  its re-sync confidence score is less than zero AND a search result was returned for the re-sync result AND the search result confidence score exceeds the Ad hoc search acceptance threshold, AND the search result timecode is within ½ sec. of the re-sync result's accepted timecode in the preliminary re-synchronized transcript 229,
  OR its re-sync confidence score is greater than zero AND the search result confidence score exceeds the Ad hoc search acceptance threshold, AND the search result timecode is within ½ sec. of the re-sync result's timecode in the preliminary re-synchronized transcript 229.

A re-sync result which includes a confidence score that is less than the re-sync acceptance threshold is not assigned any timecode if:
  its re-sync confidence score is less than zero AND no search result was returned for the re-sync result A re-sync result accepts the search result's timecode if:
  its re-sync confidence score is less than the re-sync acceptance threshold AND its re-sync confidence score is less than zero AND a search result was returned for the re-sync result AND the search result confidence score exceeds the Ad hoc search acceptance threshold AND the search result timecode is not within ½ sec of the re-sync result's accepted timecode in the preliminary re-synchronized transcript 229
  OR its re-sync confidence score is less than the re-sync acceptance threshold AND its re-sync confidence score is greater than zero AND the search result confidence score exceeds the Ad hoc search acceptance threshold AND the search result timecode is not within ½ sec of the re-sync result's timecode in the preliminary re-synchronized transcript 229
  OR its re-sync confidence score exceeds the re-sync acceptance threshold AND (its re-sync result timecode minus the search result timecode is less than the Ad hoc acceptance time window OR its re-sync confidence score is less than the re-sync acceptance threshold minus an offset)
  OR the search result's confidence score exceeds the Ad hoc search acceptance threshold AND (its re-sync result timecode minus the search result timecode is less than the Ad hoc acceptance time window OR its re-sync confidence score is less than the re-sync acceptance threshold minus an offset).

A re-sync result which includes a confidence score that is less than the re-sync acceptance threshold computes a timecode using a relative offset of the original caption to the closest accepted caption if:
  its re-sync confidence score is less than zero, a search result was returned for the re-sync result AND the search result confidence score does not exceed the Ad hoc search acceptance threshold
  OR its re-sync confidence score is greater than zero AND the search result confidence score does not exceed the Ad hoc search acceptance threshold.

Furthermore, in some examples, if the time gap between the hint timecodes for the current and last accepted captions is greater than (maximum caption spacing (in seconds) * # of intervening captions):
  If the search timecode minus the last accepted timecode is less than half of the above, the search result is rejected.
  If the search timecode minus the last accepted timecode is greater than 1.5* the above, the search result is rejected.

The steps described immediately above are especially useful for transcripts which have large time gaps in the captions, representing a significant portion of non-dialogue. In particular, the steps described above prevent the re-synchronization process from incorrectly accepting dialogue before or after a large edit.

If either the search result or the re-sync result is accepted, and there is more than one (unaligned) caption since the last accepted caption
  There are 2 possible ways to set the intervening caption timecodes—use the difference between the last accepted caption's timecode and its corresponding hint timecode, walking forward. Or walk backward from the current caption, using the delta between the current caption and its corresponding hint timecode. The following steps reconcile any inconsistency between these, to ensure the re-sync results are always in time ascending order. The basic method is as follows:
  i. find the largest hint timecode gap between the last accepted and the current caption
  ii. If the maximum hint timecode gap is greater than the (search timecode minus the last accepted timecode), assume the gap was edited out.
  iii. walk forwards from the last accepted caption to the caption where the largest gap was found above. For each caption, set it's timecode as the last accepted timecode plus the hint delta timecode. That is, the intervening captions are adjusted based on the delta between the last accepted caption and its corresponding hint timecode, until you reach the caption with the maximum delta hint timecode.
  iv. Make a final backwards pass, starting from the current caption to the last accepted caption. For this pass, the delta time is based on the current caption minus its corresponding hint timecode. Once the maximum hint gap caption is reached and if the liens are in ascending time order, exit the backwards pass. Otherwise, assume the forward pass was incorrect, and continue walking backwards, adjusting based on the current caption's timecode. Exit the backwards pass when the re-sync captions are in strict ascending time order.

Once a result is accepted, a delta between the accepted caption's re-sync timecode and the hint timecode is accepted. This delta is used to adjust subsequent hint timecode. For instance, if a result is 15 seconds off from the current hint timecode, assume that all subsequent hint timecodes are also 15 seconds off due to an edit.

If a caption with an accepted timecode occurs earlier in time than the previous caption (indicating the previous caption was likely misaligned), walk backwards from the current caption until the previous accepted caption is reached. Each caption in the interval is re-adjusted using the same formula of adding the "relative offset" for the accepted caption.

For the subset that was walked backwards through, run a final forward pass to ensure the captions are in forward time order. Line up the captions, if necessary, with the earlier accepted caption until all captions are in strict forward time order.

The result of the final alignment module 228 is passed out of the system 100 as the re-synchronized transcript 106.

4 Additional/Different Embodiments

Language identification of text and audio prior as preprocessing step prior to the timing or retiming process to validate the language.

Reference transcript sync as a pass/fail (validation) the caption file applies to the audio file (note, both LID and transcript sync can be used as a file based quality control step prior to broadcast playout).

Use of duplicate spotting to exact caption information for use in other files with similar segments (applies to both music intros, repeated music segments, and long form to clip where we are matching the clip to the parent long form file, looking at the caption file on x seconds on either side of the clip and trimming the captioning based on transcript sync).

Application of silence, voice activity, and music detection to determine areas of potential errors, specifically cover how our technologies can be used to direct the human operator to areas requiring manual intervention.

Search: Use of phonetic search to assist with placement of manual sync points. When captions where more than x seconds off, do a windowed search at x seconds before and after the specified time in order to suggest to the end user where the correct location might be and allow them to rapidly move between candidate results. The hits not selected may represent useful information. The phonetic search times could be used in combination with other data.

High scoring false positives: Use of speaking rate detection to determine which high scoring captions may be incorrectly placed. If the caption timing does not correlate to the interpolated time based on speaking rate detection or was different by a significant margin, then flag them for manual review.

5 Implementations

Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It is to be understood that the foregoing description is intended to illustrate and not to limit the scope of the invention, which is defined by the scope of the appended claims. Other embodiments are within the scope of the following claims.

What is claimed is:

1. A computer implemented method for aligning two versions of an audio recording and a transcript comprising:
   receiving a first version of the two versions of the audio recording and a second version of the two versions of the audio recording, wherein one version of the two versions of the audio recording includes a modification of the other version of the audio recording;
   receiving a transcript including a plurality of terms, each term of the plurality of terms associated with a time location within the first version of the audio recording;
   forming via a search term formation module a plurality of search terms from the terms of the transcript;
   using an alignment module to:
     determine possible time locations of the search terms in the second version of the audio recording;
     determine a correspondence between time locations within the first version of the audio recording associated with the search terms and the possible time locations of the search terms in the second version of the audio recording; and
     align the second version of the audio recording and the transcript including updating the time location associated with terms of the transcript based on the determined correspondence, wherein updating the time location comprises, if a first time difference between a time location of a first term and a time location of a second term within the first version of the audio recording is similar to a second time difference between an updated time location of a first term and an updated time location of a second term then updating a time location associated with a term located between the first term and the second term based on a predicted time location of the term.

2. The method of claim 1 wherein updating the time locations associated with the term located between the first term and the second term includes verifying the predicted time locations of the term.

3. The method of claim 2 wherein verifying the predicted time location of the term includes searching for the term located between the first term and the second term at the predicted time location in the audio associated with the term.

4. The method of claim 1 wherein determining if the first time difference and the second time difference are similar includes determining a measure of time dilation between the second version of the audio recording and the first version of the audio recording and compensating for the time dilation when determining the similarity between the first time difference and the second time difference.

5. The method of claim 1 wherein aligning the second version of the audio recording and the transcript includes manually associating at least some of the time locations associated with the terms of the transcript with time locations in the second version of the audio recording.

6. The method of claim 1 wherein the first version of the audio recording includes a time axis which differs from a time axis of the second version audio recording.

7. The method of claim 1 wherein each term of the plurality of terms includes one or more words.

8. The method of claim 1 wherein each of the search terms of the plurality of search terms includes a plurality of phonemes determined from the terms of the transcript.

9. The method of claim 1 wherein determining the possible time locations of the search terms in the second version of the audio recording includes performing a phonetic search for the search terms.

10. The method of claim 9 wherein performing the phonetic search includes searching using a wordspotting algorithm.

11. A system for aligning two versions of an audio recording and a transcript comprising:
   an input for receiving a first version of the two versions of the audio recording and a second version of the two versions of the audio recording, wherein one version of the two versions of the audio recording includes a modification of the other version of the audio recording;
   an input for receiving a transcript including a plurality of terms, each term of the plurality of terms associated with a time location within the first version of the audio recording;
   a search term formation module configured to form a plurality of search terms from the terms of the transcript;
   an alignment module configured to:
      determine possible time locations of the search terms in the second version of the audio recording;
      determine a correspondence between time locations within the first version of the audio recording associated with the search terms and the possible time locations of the search terms in the second version of the audio recording; and
      align the second version of the audio recording and the transcript including, updating the time location associated with terms of the transcript based on the determined correspondence, wherein updating the time location comprises, if a first time difference between a time location of a first term and a time location of a second term within the first version of the audio recording is similar to a second time difference between an updated time location of a first term and an updated time location of a second term then updating a time location associated with a term located between the first term and the second term based on a predicted time location of the term.

12. The system of claim 11 wherein the alignment module is further configured to verify a predicted time locations of the term.

13. The system of claim 12 wherein verifying the predicted time location of the term includes searching for the term located between the first term and the second term at the predicted time location in the audio associated with the term.

14. The system of claim 11 wherein the alignment module is further configured to determine a measure of time dilation between the second version of the audio recording and the first version of the audio recording and compensate for the time dilation when determining the similarity between the first time difference and the second time difference.

15. The system of claim 11 wherein the alignment module is further configured to align the transcript and the second version audio recording according to a manual association of at least some of the time locations associated with the terms of the transcript with time locations in the second version of the audio recording.

16. The system of claim 11 wherein the first version of the audio recording includes a time axis which differs from a time axis of the second version of the audio recording.

17. The system of claim 11 wherein each term of the plurality of terms includes one or more words.

18. The system of claim 11 wherein each of the search terms of the plurality of search terms includes a plurality of phonemes determined from the terms of the transcript.

19. The system of claim 11 wherein the alignment module is configured to execute a phonetic search on the search terms.

20. The system of claim 19 wherein executing the phonetic search includes searching using a wordspotting algorithm.

21. Software stored on a non-transitory computer-readable medium comprising instructions for causing a data processing system to:
   receive two versions of an audio recording including receiving a first version of the audio recording and receiving a second version of the audio recording, wherein one version of the two versions of the audio recording includes a modification of the other version of the audio recording;
   receive a transcript including a plurality of terms, each term of the plurality of terms associated with a time location within the first version of the audio recording;
   form via a search term formation module a plurality of search terms from the terms of the transcript;
   use an alignment module to:
      determine possible time locations of the search terms in the second version of the audio recording;
      determine a correspondence between time locations within the first version of the audio recording associated with the search terms and the possible time locations of the search terms in the second version of the audio recording; and
      align the second version of the audio recording and the transcript including, updating the time location associated with terms of the transcript based on the determined correspondence, wherein updating the time location comprises, if a first time difference between a time location of a first term and a time location of a second term within the first version of the audio recording is similar to a second time difference between an updated time location of a first term and an updated time location of a second term then updating a time location associated with a term located between the first term and the second term based on a predicted time location of the term.

* * * * *